United States Patent [19]
Lawton et al.

[11] Patent Number: 5,143,817
[45] Date of Patent: Sep. 1, 1992

[54] SOLID IMAGING SYSTEM

[75] Inventors: John A. Lawton, Landenberg, Pa.; Roxy N. Fan, E. Brunswick, N.J.

[73] Assignee: E. I. Du Pont de Nemours and Company, Wilmington, Del.

[21] Appl. No.: 455,473

[22] Filed: Dec. 22, 1989

[51] Int. Cl.[5] .......... B05D 3/06; B29D 11/00; G03B 35/00; G03C 9/08
[52] U.S. Cl. .................. 430/269; 264/22; 264/18; 264/139; 264/160; 264/163; 264/40.1; 264/284; 264/293; 264/297.6; 264/299; 264/241; 264/253; 264/308; 264/313; 264/316; 264/338; 425/174.4; 425/174.0; 425/89; 425/218; 425/90; 425/93; 427/53.1; 427/54.1; 118/56; 118/261; 118/403; 118/404; 118/406; 118/407; 118/413; 118/415; 118/422; 118/423; 118/428; 264/58; 264/212; 264/213; 264/239
[58] Field of Search ............. 430/269; 264/22, 138, 264/139, 160, 163, 40.1, 284, 293, 297.6, 299, 58, 212, 213, 239, 241, 253, 308, 313, 316, 338; 425/174.4, 174.0, 89, 218, 174.5, 90, 93; 427/53.1, 54.1, 131, 164, 165, 169, 258, 270, 271, 299, 302, 355, 356, 358, 369, 402, 407.1, 430.1, 56, 261, 403, 404, 406, 407, 413, 415, 422, 423, 428; 118/56, 261, 403, 404, 406, 407, 413, 415, 422, 423, 428

[56] References Cited

U.S. PATENT DOCUMENTS

| | | | |
|---|---|---|---|
| 4,251,618 | 2/1981 | McCartin | 430/270 |
| 4,575,330 | 3/1986 | Hull | 425/174.4 |
| 4,752,498 | 6/1988 | Fudim | 427/54.1 |
| 4,929,402 | 5/1990 | Hull | 264/22 |

FOREIGN PATENT DOCUMENTS 0250121  2/1987  European Pat. Off.

OTHER PUBLICATIONS

Hideo Kodama, "Automatic Method for fabricating a three-dimensional plastic model with photo-hardening polymer", 1981, pp. 1770–1773.

Alan J. Herbert, "Solid Object Generation", 1982, pp. 185–188.

A. J. Herbert, "A Review of 3D Solid Object Generation", 1989, pp. 186–190.

*Primary Examiner*—Cynthia Hamilton
*Attorney, Agent, or Firm*—Thomas H. Magee

[57] ABSTRACT

An apparatus and method for fabricating integral three-dimensional objects from successive layers of photoformable compositions by exposing the layers of the composition through a detachable flexible transparent film, one side of the film being in contact with the composition and the other side of the film with a rigid transparent plate, which guides and supports the film.

34 Claims, 4 Drawing Sheets

SOLID IMAGING SYSTEM

FIELD OF THE INVENTION

This invention relates to production of three-dimensional objects by photoforming, and more particularly to the controlled application of thin flat layers of a photoformable composition accurately and quickly to a platform or previously photoformed layer(s) to accomplish said production with layers of improved flatness, accuracy and integrity.

BACKGROUND OF THE INVENTION

Many systems for production of three-dimensional modeling by photoforming have been proposed. European Patent Application No. 250,121 filed by Scitex Corporation Ltd., on Jun. 6, 1987, which discloses a three-dimensional modeling apparatus using a solidifiable liquid, and provides a good summary of documents pertinent to this art. U.S. Pat. No. 4,575,330 (C. W. Hull), issued on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process. U.S. Pat. No. 4,752,498 (E. V. Fudim), issued on Jun. 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking so that when a subsequent layer is formed it will adhere thereto. Using this method, multilayer objects can be made.

Publication "Automatic Method for fabricating a three-dimensional plastic model with photohardening polymer" by Hideo Kodama, *Rev. Sci. Instrum.* 52(11), 1770-1773, Nov. 1981, describes a method for automatic fabrication of a three-dimensional plastic model. The solid model is fabricated by exposing liquid photoforming polymer to ultraviolet rays, and stacking the cross-sectional solidified layers. Publication "Solid Object Generation" by Alan J. Herbert, Journal of Applied Photographic Engineering, 8(4), 185-188, August 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory.

A good review of the different methods is also given by a more recent publication, titled "A Review of 3D Solid Object Generation" by A. J. Herbert, *Journal of Imaging Technology* 15: 186-190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photoformable composition with a laser beam according to a desired pattern and building a three-dimensional model layer by layer. In addition to various exposure techniques, several methods of creating thin liquid layers are described which allow both coating a platform initially and coating successive layers previously exposed and solidified.

Current methods of coating suggested thus far, however, have drawbacks in that they are not capable of ensuring flat uniform layer thickness or of producing such layers quickly, or they do not effectively prevent damage or distortion to previously formed layers during the successive coating process and they involve coating only liquid formulations of preferably low viscosity. Furthermore, they omit to recognize very important parameters involved in the coating process such as the effects of having both solid and liquid regions present during the formation of the thin liquid layers, the effects of fluid flow and rheological characteristics of the liquid, the tendency for thin photoformed layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example describes a dipping process where a platform is lowered either one layer thickness or is dipped below the distance of one layer in a vat then brought up to within one layer thickness of the surface of the photoformable liquid. Hull further suggests that low viscosity liquids are preferable, but for other practical reasons, the photoformable liquids are generally high viscosity liquids. Although theoretically most liquids will flatten out eventually, high viscosity liquids and even low viscosity liquids take an inordinate amount of time to flatten to an acceptable degree especially if large flat areas are being imaged and if the liquid layer thickness is very thin. Regions where previous layers consist of solid walls surrounding liquid pools further compounds the flattening process of the thin liquid layer coating. In addition, motion of the platform and parts, which have cantilevered or beam (regions unsupported in the Z direction by previous layer sections), within the liquid creates deflections in the layers, contributing to a lack of tolerance in the finished part.

The Munz patent (U.S. Pat. No. 2,775,758, issued in 1956) and Scitex application describe methods by which the photoformable liquid is introduced into the vat by means of a pump or similar apparatus such that the new liquid level surface forms in one layer thickness over the previously exposed layers. Such methods have all the problems of the Hull methods except that the deflections of the layers during coating is reduced.

The Fudim patent describes the use of a transmitting material, usually rigid and coated or inherently unlikely to adhere to the solidified photopolymer, to fix the surface of the photopolymer liquid to a desired shape, assumably flat, through which photopolymers of desired thickness are solidified. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface. Furthermore, evaluations made by the Applicants indicate that the forces, resisting the separation or even sliding off the solidified layer having been exposed in intimate contact with the suitably non-adhesive transmitting material, are capable of damaging the solidified layer, especially when surrounded by photoformable liquid and even more especially when the solidified layers are thin. No method is described in the Fudim patent to eliminate these problems.

It is an object of the present invention to provide a method and apparatus for quickly producing layers of a deformable and photoformable material, which are flat, and with which previously exposed and solidified layers have improved flatness, accuracy and integrity during the process. Preferably, the solidified layers according to this invention have a thickness of less than 0.030" and are flat to within 0.001" per inch. Deformable compositions are those, which under pressure alone, or under both pressure and temperature take the form of the mold they are in, or the shape of the surfaces they are pressed by. The layer is considered to be solidified when hardened, or polymerized, or crosslinked by the radiation, or even more generally when its viscosity is increased by the radiation, so that higher pressure and/or temperature will be needed for it to be re-deformed. Liquids are the preferred deformable compositions, as they deform by the pressure of their own weight.

SUMMARY OF THE INVENTION

The instant invention is directed to a method and apparatus for direct production of three-dimensional objects layer by layer using exposure means for each layer, wherein the coating of each layer is controlled to be thin, flat, quickly applied and non-detrimental to previously applied and exposed layers. More particularly, this invention pertains to a method for quickly and accurately fabricating an integral three-dimensional object from successive solidified layers from a deformable, photoformable and preferably liquid composition comprising the steps of:

(a) placing the composition in a vessel containing a substantially flat platform;

(b) positioning within the composition a tensioned, transparent, flexible and non-adherent film having a first and a second surface, the first surface being opposite and parallel to the second surface, the first surface being disposed in a way to prevent wetting of said first surface by the composition, and at least part of the second surface being disposed in a way to be in contact with the composition;

(c) securing on top of the film at a first position, a substantially flat, substantially rigid and substantially transparent plate having an upper and a lower planar surface, the upper surface being opposite and parallel to the lower surface, such that the lower planar surface of the plate is parallel to and in contact with the first surface of the film, the plate guiding the film to an original position so that the film becomes parallel and lies on top of the flat platform at a distance equal to the thickness of a layer;

(d) exposing imagewise the photoformable composition contained between the film and the platform to radiation through the transparent plate and through the transparent film, in order to form a solidified layer, with the requirement that the radiation is high enough to cause reasonable adherence between the solidified layer and the platform;

(e) removing the transparent plate from the first position on top of the platform to a second position away from the platform;

(f) detaching the film from the solidified layer, and from the unexposed deformable composition;

(g) causing the deformable composition to flow over the solidified layer;

(h) increasing the distance between the platform and the original position of the film by the thickness of a layer;

(i) repositioning the film within the composition as in step (b)

(j) resecuring the plate at the first position on top of the film, such that the lower planar surface of the plate is parallel to and in contact with the first surface of the film, the plate guiding the film such that it is parallel to and lying on top of the previously solidified layer at a distance equal to the thickness of a layer;

(k) exposing imagewise to radiation, through the transparent plate and through the transparent film, the photoformable composition contained between the film and the previously solidified layer in order to form a new solidified layer, with the requirement that the radiation is high enough to cause reasonable adherence between the newly solidified layer and the previously solidified layer;

(l) removing the transparent plate again from the first position on top of the platform to the second position away from the plate;

(m) detaching the film from the newly solidified layer and from the unexposed deformable composition; and (n) repeating steps (g) through (m) until the integral three-dimensional object is formed.

This invention also pertains to an apparatus for quickly and accurately fabricating an integral three-dimensional object from successive solidified layers of a deformable photoformable composition comprising:

imaging means for imagewise exposing to radiation each of the successive layers of the photoformable composition; and a coating station comprising, a vessel for containing the composition;

a substantially flat platform disposed within the vessel;

a transparent, flexible and non-adherent film supported under tension over the platform, the film having a first and a second surface, the first surface being opposite and parallel to the second surface, the film intended to be operable within the composition in a manner preventing wetting of the first surface by the composition, and allowing at least part of the second surface to be in contact with the composition;

a substantially flat, substantially rigid and substantially transparent plate secured at a first position on top of the film, the plate having an upper and a lower planar surface, the upper surface being at the opposite side of and parallel to the lower surface, such that the lower planar surface of the plate is also parallel to and in contact with the first surface of the film, the plate guiding the film to be on top and parallel to the flat platform;

placement means for controllably varying the distance between the second surface of the film and the platform in order to allow the successive layers of the photoformable composition to be formed under said second surface and be solidified by the imagewise
exposure to radiation provided by the imaging means;
means for removing the plate from its first position to a
   second position;
means for causing the deformable composition to flow
   over the solidified layer; and
means for detaching the film.

Preferably, the composition is a liquid and the imaging means comprises:
radiation means for providing a radiation beam, the
   radiation beam having an intensity;
deflection means for controllably deflecting the radiation beam;
modulation means positioned between the radiation
   means and the deflection means for modulating the
   intensity of the radiation beam; and
computer means for storing graphic data corresponding
   to the shape of the rigid object, the computer means
   being also coupled to the modulation means, the deflection means and the placement means, in order to
   control said modulation means, deflection means and
   placement means according to the graphic data.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE
INVENTION

This invention relates to a method and apparatus for producing three-dimensional objects by solidifying successive layers of deformable and photoformable composition, and more particularly to controlled ways of providing flat thin photoformable composition layers quickly, ways of avoiding distortion and damage of the layers of the photoformed and solidified composition which has been exposed, and ways of applying these successive layers of deformable composition, which ways prevent the introduction of gas bubbles and reduce distortion to previously exposed and solidified layers, and are produced with improved flatness, accuracy and integrity.

Figure 1:
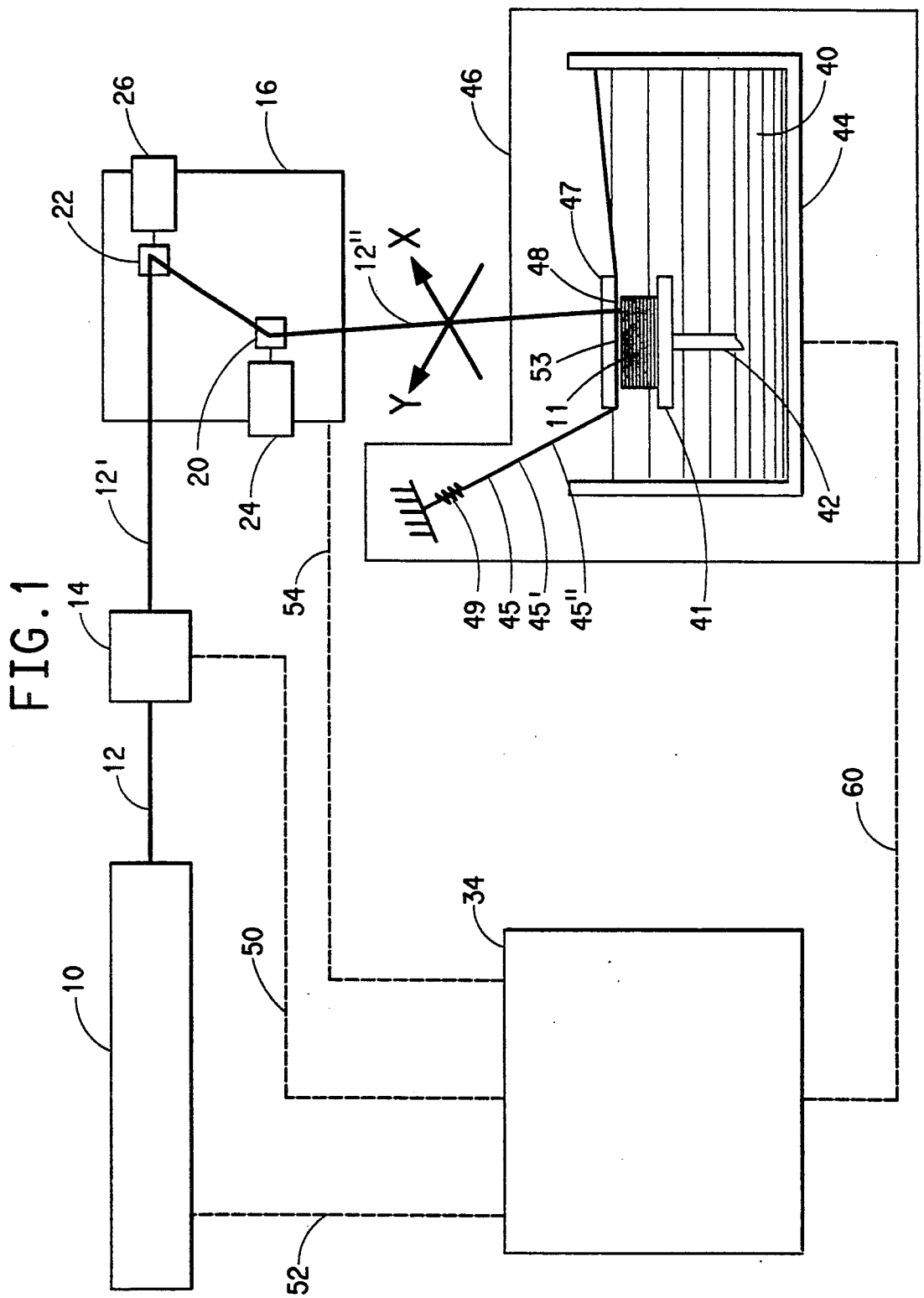
FIG. 1 is a schematic diagram showing the apparatus utilized in the practice of a preferred embodiment of the instant invention.

A preferred embodiment of this invention is illustrated in FIG. 1. There is provided an imaging station or means including a radiation source 10, a modulator 14, a computer 34 and a scanner 16. There is also provided a coating station 46. Radiation means 10, is preferably as a laser, producing a radiation beam 12. Being desirable to produce solid objects at high speed, the apparatus of the instant invention preferably utilizes relatively high power radiation means 10, such as high power lasers, which may have major bands in the visible, infrared, or ultraviolet regions. High power is considered to be a power greater than 20 mW, and preferably over 100 mW as measured from the intensity of radiation beam 12. This is so with the present photospeeds of photoformable compositions. However, as faster compositions become available, the values of 20 mW and 100 mW for the beam intensity will become lower accordingly, since photospeed of the composition and intensity of the radiation beam have an inverse relation to each other in order to achieve the same results. The selection of a certain type of laser should be coordinated with the selection of the photoformable composition in a way that the sensitivity of the photoformable composition agrees reasonably well with the wavelength of the laser's emission. Other types of radiation means may also be utilized such as electron beams, x-rays, and the like, as long as their energy type is matched with the sensitivity of the photoformable composition, a beam is provided, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 12 passes through modulator 14, the modulator being preferably an acousto-optical modulator. The modulated radiation beam 12' passes in turn through deflection means 16, which comprises two mirrors 20 and 22, each mirror having an axis (not shown), allowing reflection of the beam to surface 53 in X and Y directions, the X and Y directions being perpendicular to each other and parallel to surface 53. The mirrors 20 and 22 may rotatably move around their corresponding axes by means of motors 24 and 26, respectively for controllably deflecting the beam in a vector scanning mode, in the X and Y directions towards predetermined positions of a photoformable composition 40, contained in vessel 44 of the coating station 46. Examples of suitable photoformable compositions are given at a later section of this description. As the beam is deflected by the deflection means 16, it assumes an acceleration from zero level to a maximum acceleration and a velocity from zero level to a maximum constant velocity. The velocity and the intensity of the beam remain proportional to each other, so that the exposure remains substantially constant. The beam exposes imagewise preselected portions of the composition to a substantially constant depth as described below.

For the purposes of this invention, however, the radiation beam 12" may be not only a focused beam from a laser, but also other light source or light, modified in a number of different ways. For example, it may be transmitted through any type of variable optical density photomask such as a liquid crystal display, silver halide film, electro-deposited mask etc., or reflected off of any variable optical density device, such as a reflective liquid crystal cell.

Figure 2:
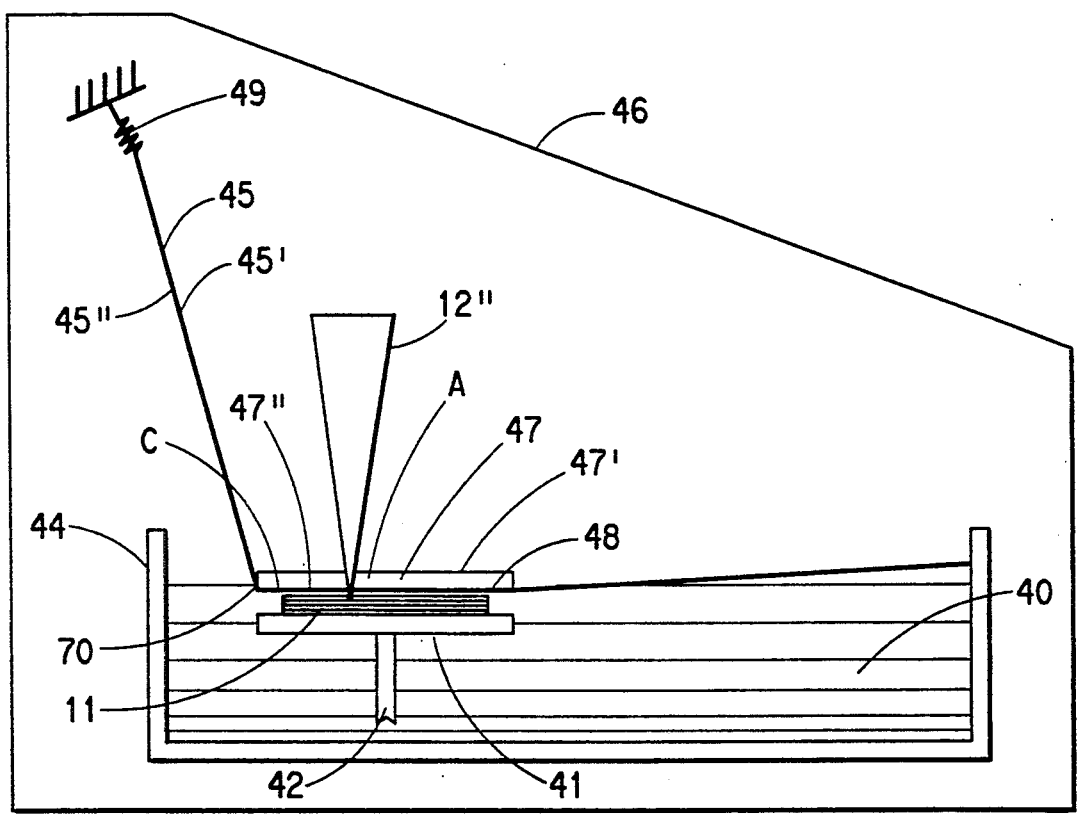
FIG. 2 illustrates in a schematic form the position of components of the coating station in preparation for and during exposure of a layer, according to the present invention.

FIG. 2, depicts in more detail the coating station 46 of the preferred embodiment of this invention, there is provided a vessel 44 for containing the photoformable composition 40. There is also provided a substantially flat platform 41 disposed within the vessel 44 and within the composition 40. Above vessel 44, there is tension means 49 connected to a fixed point at one end and attached to a transparent flexible film 45 at the other end. Film 45 is tensioned by tension means 49 and thus it is pulled firmly under a substantially rigid transparent plate 47. Film 45 is secured at the other end either rigidly or otherwise, such as by additional tension means and the like. Film 45 should be transparent, flexible and non-adherent to composition 40 at least after solidification of the composition by exposure to actinic radiation, and preferably even before irradiation. The rigid plate 47 guides film 45 over the platform in a way to be substantially parallel to the platform.

The film 45 has a first surface 45' and a second surface 45", the two surfaces being on the opposite sides of the film, and parallel to each other. Film 45, being intended to be operable within the composition 40, is dipped in composition 40 in a way that the first surface 45' is away from the composition, and prevented to be wetted by the composition 40. On the other hand, the second surface 45" is at least partially in contact with the composition 40.

Figure 3:
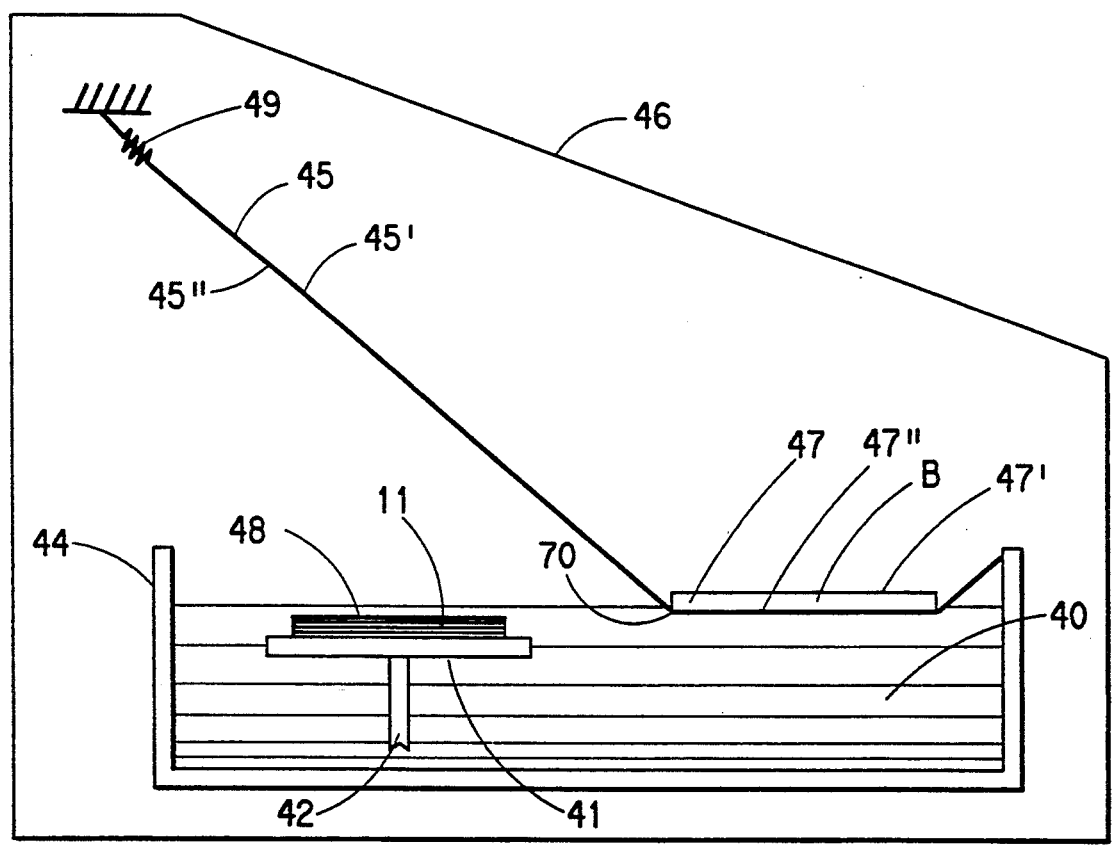
FIG. 3 illustrates the position of components of the coating station after the film has been detached from the solidified layer and the platform has moved down by the thickness of one layer.

Plate 47, being substantially flat, substantially rigid, and substantially transparent to actinic radiation, has an upper planar surface 47', and a lower planar surface 47", the two surfaces being on the opposite sides of plate 47, and substantially parallel to each other. Plate 47 is secured on top of film 45 at a first position A as depicted in FIG. 2 by conventional means not shown in the figures, in a way that the lower surface 47" of plate 47 is in contact with the first surface 45' of tensioned film 45. Under these conditions, plate 47 guides film 45 to an original position C so that film 45 lies on top and is parallel to the flat platform 41. Plate 47 may be removed from its first position A as shown in FIG. 2, to a second position B, as is illustrated in FIG. 3, by conventional removing means. Removing of the plate 47 from its first position to a second position may be preferably conducted in the form of translational movement, and even more preferably in the form of a horizontal translational movement, so that both the first position A and second position B of plate 47 are on the same plane, which plane is parallel to platform 41. FIG. 3 illustrates the components of FIG. 2 in a different stage of the object formation process in which all the components are the same except that the transparent plate 47 has been translated horizontally by removing means (not shown). Removal of the transparent plate, however, does not necessarily have to be translational. Any type of conventional mechanical or electromechanical means may be used as removing means for plate 47. A conventional motor/screw or motor/chain mechanism with guides to direct the motion of plate 47 is an example of such a mechanism. Such conventional mechanisms are not shown in the figures as being obvious, and for the sake of simplicity.

It should be noted that film 45 may also be in the form of a continuous web, or it may be in the form of a roll at one side, which is being unrolled during the process, preferably during the returning of Plate 47 to its original position, and which is being rolled at the other side.

There is also provided placement means 42, for controllably varying the distance between the platform 41 and the second surface 45" of film 45 in order to allow the successive layers 11 of the photoformable composition 40 to be formed under second surface 45" of film 45 and be solidified by the imagewise exposure to radiation provided by the imaging means. The layer 48 of composition 40, included between the second surface 45" of film 45 and either the previously solidified layers 11 or the platform 41 in the absence of other solidified layers, is initially deformable and preferably a liquid before exposure, but it solidifies after the exposure to actinic radiation. It is preferable that placement means 42 is controlled by computer 34, and that the platform 41 is moved in a direction normal to the lower planar surface of transparent plate 47.

Since according to this invention the thickness of layer 48 is defined by the distance between the platform and the second surface 45" of the film 45 and the platform 41, the distance increase for forming the successive layers may be achieved by moving either the platform or the film/plate system. Thus, the positions of the film (such as the original position) and the plate (such as the first position) have as reference point the film/plate assembly, and not the platform or the vessel.

Means (not shown for the sake of simplicity) for detaching the film away from the imagewise exposed and solidified layer, preferably by peeling, are also provided. This may be a completely separate conventional mechanism which pulls the film upon command away from the layer. Tension element 49, which tensions film 45, may be selected to be strong enough or in any other manner suitable, so that upon removal of plate 47, it pulls and detaches the film away from the solidified layer, and therefore it also acts as detaching means. The detaching means has to be disposed in a position, so that when plate 47 is in its second position, the plate is out of the way and it does not prevent the detaching means from detaching the film. It is preferable that the detaching from the solidified layer takes place in a line front and not randomly. It is also more preferable that the line front is defined by the sharp bend produced on the film by a linear edge 70 of the plate. The detaching may be allowed to take place simultaneously with the removing step of the plate, or after the plate has been removed. The former is preferred.

As shown in FIG. 1, communication lines 52, 50, 54, and 60 are also provided for computer 34 to control the radiation source 10, the modulator 14, the deflection means 16, and the placement means 42, respectively. The removing means of plate 47, as well as the detaching means of the film, may also be controlled by computer 34. A preferred way for preventing the photoformable composition 40 from flowing on top of the flexible transparent film 45 and contaminate the first surface 45' of film 45, or the surface 47" of plate 47, may easily be seen by reference to FIG. 4, which represents a cross section of the configuration illustrated in FIG. 2. The side edges of film 45 are deflected and supported upwardly to prevent contamination or wetting of said surfaces. This support may be realized by just raising the side edges of film 45 by any conventional support means 3 and 3'. Use of an elastic film attached to film 45, and stretched upwardly, is an example of such means.

Figure 4:
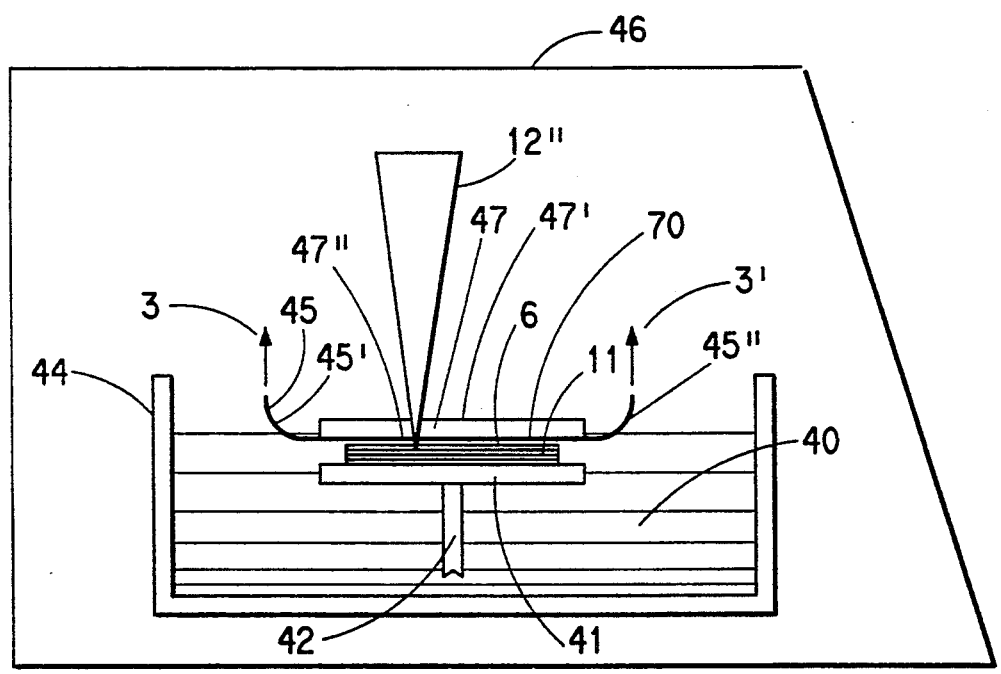
FIG. 4 illustrates a cross-sectional view of FIG. 2 detailing primarily a preferred way of supporting the side portions of the flexible film.

Many variations and choices of materials are useful for the method illustrated in FIGS. 2–4. Tension element 49 may be a spring, series of springs, elastic band, weight with a pulley, clutch, tension rod, rod in a solenoid, and the like. It is only important that regardless of what this element is, it applies sufficient tension in the flexible transparent film 45 to ensure that film 45 is flat and in contact with the lower surface of transparent plate 47 during imagewise exposure by actinic radiation, such as beam 12", and which ensures a preferably even detachment from the surface of the solidified composition; or, said tension element 49 may not be needed if the flexible transparent film 45 is also elastomeric and sufficiently tensioned for the above described use. As a matter of fact, only part of the film may be elastomeric in order to serve the above mentioned as well as other purposes. The flexible transparent film 45 may be any material; which is substantially transparent to radiation beam 12" and of sufficient optical quality to prevent scattering of beam 12"; which is of substantially uniform thickness; which is flexible enough to withstand repetitive bending where detached or peeled and where bent by support means 3 and 3'; which may have suitable elastomeric characteristics to provide the necessary tension represented by tension element 49 and/or the necessary vertical edge support represented by vertical support means 3 and 3'; which is not permeable to the photoformable composition 40; which is smooth; and which is substantially non adhering to the deformable layer 48 of the photoformable composition 40 or to the solidified part 11 of composition 40.

Examples of suitable flexible transparent film 45 are PFA, PTFE, FEP films, polypropylene film, polyethylene film, siliconized polyester film, polyethylene terephthalate film having a releasable layer of polydimethyl siloxane coated thereon, and the like. Example of a suitable elastomeric flexible transparent film 45 is a modified Calrez fluorocarbon elastomer film produced by E. I. du Pont de Nemours Inc., Wilmington Del.

The transparent plate 47 may be any material which is of substantially uniform thickness and flatness, with adequate rigidity to maintain desired flatness while exposures by radiation beam 12" are being accomplished and is of sufficient transmittance and optical clarity to allow said radiation beam 12" to transmit through said transparent plate 47 for efficient photohardening or solidification of photoformable composition 48 one layer's thickness below said transparent flexible film 45. Examples of suitable materials for use as a transparent plate 47 are flat glass or silica plates as well as plastic ones such as transparent acrylic or polycarbonate plates. The only critical requirement is that they are transparent and substantially flat. Support means 3 and 3', as already mentioned, may be an element which holds the edges of the flexible transparent film 45 above the surface of the photoformable composition 2. Additional examples of support means 3 and 3' are stretched elastomeric materials such a Lycra® manufactured by E. I. du Pont de Nemours Inc., Wilmington Del., and rubbers sewn or bonded to the length of said edges of the flexible transparent film 45, above the level of the composition. Other examples may include the attachment of curtain rings or wires to said edges, and holding the edges above the level of the composition.

As already mentioned, removal, including translation of the transparent plate 47 as a preferred case, may be performed by any conventional removing or translation means that allows detaching said flexible transparent film 45 from the surface of the solidified composition 11, either as a separate step or in concurrence with the plate removing step.

It has been discovered by the Applicants that photoformable compositions, exposed by radiation means while in intimate contact with a relatively rigid surface, form substantially strong bonds, that cannot be easily overcome by direct pulling of the two surfaces apart or by sliding one surface relative to each other, even though that surface is coated with a suitable anti-stick material. Polytetrafluoroethylene, PFA, polypropylene, and polyethylene films, which have little or no chemical interaction with the photoformable or photohardened (solidified) composition, and therefore, which should have no adherence to such materials, could not be directly pulled from the surface of the hardened or solidified composition or slid off said surface after exposure in a similar arrangement as shown in FIGS. 1–4, with the difference that the flexible film was absent, despite the fact that the rigid plate was absent. However, the Applicants discovered that by following the steps of the present invention, the film detaches from the surface with little effort. It should be noted at this point that the meaning of the words photohardening, hardening and solidifying in this text denotes transformation of a deformable material to a solid by radiation means. These three words are used interchangeably. Also, as long as a material does not flow under its own weight, it is considered to be a non-liquid.

The photoformable compositions which can be used in the practice of the instant invention are any compositions which undergo solidification under exposure. Such compositions comprise usually but not necessarily a photosensitive material and a photoinitiator. The word "photo" is used here to denote not only light, but also any other type of actinic radiation which may transform a deformable composition, and preferably a liquid one to a solidified one by exposure to radiation. Cationic or anionic polymerizations, as well as condensation and free radical polymerizations and combinations thereof are examples of such behavior. Cationic polymerizations are preferable, and free radical polymerizations even more preferable. Photoformable compositions containing thermally coalescible materials are of even higher preference.

A liquid thermally coalescible photoformable composition is a composition which solidifies upon exposure to actinic radiation without attaining necessarily its ultimate physical properties, particularly with respect to their adhesive and cohesive characteristics. However, it develops adequate integrity to be handled until such time when further treatment is provided. The composition is considered as coalescible when it comprises particulate matter in dispersed form, which particulate matter undergoes coalescence under a certain set of conditions, such as increased temperature for example. Coalescence is the transformation of a dispersed phase to a cohesive continuous solid phase.

Preferably the photoformable composition comprises a thermally coalescible polymeric cohesive material, a photoformable monomer, and a photoinitiator. Preferably the photoformable material comprises an ethylenically unsaturated monomer. Upon exposure to the actinic radiation, even the exposed areas of the photoformable composition must remain thermally coalescible after removing the unexposed areas. This is important to improve both adhesion in the joining surfaces between the layers and cohesion within the layers for a multilayer integral three dimensional object. Actually, cohesive bonds are formed at the joining surfaces by the thermally coalescible material providing superior properties to the structure of the final three dimensional object. It is also very important to prevent substantial overgrowth of infraposed surfaces, as it will be discussed below.

Although in the case of photoformable compositions which are not based on coalescible materials, post treatment after the exposure is not required, in the case where a coalescible material is an essential component of the formulation, further heat treatment is needed for the object to attain its ultimate strength. Thus in such cases, when all the layers of the three dimensional object have been formed by the method described above, the unexposed portions of the composition may be removed by any conventional means, such as shaking the object, blowing gas towards the object, and the like. Further removal may be achieved by rinsing the object with poor, noncoalescing solvents. Water, alcohols, and in general polar solvents are poor solvents for non-polar compositions and vice-versa. As long as the solvent under consideration does not extract excessive amounts of materials from the exposed area or it does not swell excessively the object to be rinsed within the rinsing time, it is considered to be a poor, non-coalescing solvent. The object then is thermally coalesced in order to develop high cohesive and adhesive strength. This step may be performed in an oven, such as convection, IR, microwave, and the like. Optimum temperature and time are dependent on the individual composition. Typically the temperature range is 100°–250° C. and the time range is 5–30 minutes. However, temperatures and times outside these regions may be used.

A very important group of thermally coalescible materials are plastisols. Plastisols are fluid mixtures, ranging in viscosity from pourable liquids to heavy pastes, obtained by dispersing fine particle size polymeric resins in nonvolatile liquid thermal plasticizers, i.e., materials which are compatible with the polymer or resin and increase its workability and flexibility but have no substantial solvent activity for the resin or polymer under ordinary conditions of flexibility but have no substantial solvent activity for the resin or polymer under ordinary conditions of storage (e.g., room conditions). When the plastisol has been formed into a desired shape, e.g., by molding or coating, it can be heated to coalesce the polymeric resin particles and the nonvolatile liquid constituent, thereby forming a homogeneous solid mass. Volatile diluents can be added to plastisol dispersions to modify their viscosity and to achieve desirable handling characteristics in coating or other forming operations. A dispersion that contains no more than 10% volatile diluent is regarded as a plastisol. Since the plasticizer used in the case of plastisols acts as a plasticizer to solvate the polymer only at higher temperatures than storage temperatures, it may also be called thermal plasticizer.

The most widely used plastisols are based on polyvinyl chloride homopolymer in a plasticizer. Dispersion resins (particle size 0.1 to 2 micrometer range) are generally used. They are characterized by the polymer type (homopolymer or copolymer with vinyl acetate or polyvinyl chloride containing carboxyl functional groups) molecular weight and size, shape and distribution of particles. Resins of a given molecular weight are usually chosen according to the physical requirements of the finished product. High molecular weight resins yield higher physical strength. Copolymers are used when lower fusion temperature is required. Particle size, shape, and distribution have significant effect on plastisol rheology. Blending resin (particle size range 10–150 microns) may be incorporated with the dispersion resin. They usually have low oil absorption which reduces the viscosity of the plastisol at a given plasticizer level.

Polyvinyl chloride has been described in the literature as the primary polymer used in forming plastisols. Polyvinyl chloride plastisols have been described in U.S. Pat. No. 3,795,649 wherein the polyvinyl chloride is copolymerized with other monomers, including acrylic monomers, that constitute a minority (35%) of the polymer composition. In U.S. Pat. No. 2,618,621 there are disclosed polyvinyl chloride plastisols wherein part of the plasticizer content is replaced with an acrylic monomer, which is then conventionally thermally polymerized at the temperature encountered in the step of coalescing the polyvinyl chloride resin.

Polyvinyl chloride plastisol dispersions can be made photoactive by incorporating therein a photosensitive monomer and photoinitiator, such as described in U.S. Pat. No. 4,634,562, or by having attached to the backbone of the polyvinyl chloride polymer photopolymerizable or photocrosslinkable groups, such that upon exposure to actinic radiation, the modified polyvinyl chloride polymer becomes polymerized or crosslinked. Such compositions may be used, preferably as part of the total coalescible material, or as part or total of the unsaturated monomer. The photoinitiator may also constitute part of the polymer, as described for example in U.S. Pat. Nos. 4,251,618 and 4,276,366, and be employed by the present invention, preferably as part of the total coalescible material.

In general, polyvinyl halides, polyvinylidene halides, polyvinyl halide acetates, polyvinylidene halide acetates, polyphenylene oxide, polyvinyl acetal, and mixtures thereof may be used effectively as thermally coalescible polymers. It is preferable that the halide is chloride and or fluoride. Polyvinyl halide compositions usually include thermal stabilizers, well known in the art. Stabilizers have the ability to accept the hydrogen halide which is released from the polymer as a result of thermal degradation. They also prevent discoloration. Materials commonly used as stabilizers are the Barium-Cadmium-Zinc types. They are frequently improved through addition of epoxidized oils and phosphates (chelates).

Polyelectrolyte compositions, such as described in U.S. Pat. No. 4,176,028, as well as acrylic and methacrylic plastisols, such as described in U.S. Pat. Nos. 4,421,619, 4,309,331, 4,465,572, 4,125,700 and Belgian Patent 865,180 may also be used. Other thermally coalescible compositions, such as those described in U.S. Pat. Nos. 4,523,983, 4,568,405, and 4,623,558 are also examples of compositions which may be employed in the practice of the present invention.

Plasticizers used in plastisols are generally categorized either by function or structure. Structurally, they may be classified as monomeric or polymeric, and functionally, as primary or secondary. Plasticizers which have good permanence, compatibility, and plasticizing efficiency are considered primary; less compatible ones are secondary. Typical non-polymerizable plasticizers for polyvinyl chloride resins include but are not limited to: diisodecyl phthalate, diisononyl phthalate, diisooctyl phthalate, di-2-ethylhexyl phthalate, di-2-ethylhexyl azelate, diisodecyl adipate, n-octyl-n-decyl adipate, diisononyl adipate, di-2-ethylhexyl adipate, C7 and C9 adipate, n-C6-C8-C10 phthalates, n-octyl-n-decylphthalates, ditridecylphthalate, tri-2-ethylhexyltrimellitate, triisononyl trimellitate, n-octyl-n-decyl trimellitate, polyester (Paraplex G-54, of Rohm & Haas Co., Plastolein 9750 of Emery Industries, Inc.), butyl benzylphthalate, dihexylphthalate, butyloctylphthalate, tricresyl phosphate, cresyl diphenyl phosphates, 2-ethylhexyl diphenyl phosphate, decyl diphenyl phosphate, dicapryl phthalate, di-2-ethylhexyl isophthalate, epoxide containing plasticizers such as epoxidized soybean oil, octyl epoxy tallate, and isooctyl epoxy tallate, hydrocarbons, chlorinated hydrocarbons and others.

Polymerizable plasticizers may be used together with nonpolymerizable plasticizers. They include but are not limited to 1,3-butylene glycol dimethacrylate, trimethylol propane bis-(methacrylate), trimethylol propane trimethacrylate.

Plasticizers have a profound effect in all aspects of plastisols including viscosity, rheological properties, storage ability, fusion temperature, application method, and ultimate physical properties (for example, tensile strength, % elongation, flame retardation and permanence after the thermal coalescing step). They must be carefully considered in plasticizer selection for the particular polymer dispersion resin in question. Two or more plasticizers are commonly used in addition to the epoxide plasticizer since the epoxides give additional improvement in heat stability along with barium-cadmium-zinc stabilizers for polyvinyl chloride dispersion resins. Through proper combination of polymer dispersion resins and plasticizers, stabilizers, fillers, viscosity modifiers, etc., a wide range of properties may be attained upon thermal coalescence. For example, ultimate tensile and tear strength is obtained when using high molecular weight polymer resin, low amount of plasticizer, and sufficient processing time and temperature for complete fusion. To obtain increased elongation, increased amount of plasticizer and copolymer resin (i.e., vinyl chloride with 7% vinyl acetate copolymer) may be used. A desirable and important property plastisols impart to photoformable formulations is lack of substantial shrinkage during the photoforming and fusion (thermal coalescing) step.

One or more monomers may be used in the composition. Monomers may be mono-, difunctional, trifunctional or multifunctional acrylates, methacrylates, vinyl, allyl, and the like. They may comprise other functional and/or photosensitive groups, such as epoxy, vinyl, isocyanate, urethane, and like, either by themselves if they are capable of rendering the monomer photoformable, or in addition to acrylates or methacrylates.

Examples of suitable ethylenically unsaturated monomers which can be used alone or in combination with other monomers include but are not limited to t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S Pat. No. 3,380,831, 2,2-di(p-hydroxyphenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di(p-hydroxyphenyl)propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Also included are all methacrylates, tetrahydrofurfuryl methacrylate, cyclohexyl methacrylate, diallylfumarate, n-benzylacrylate, Carbowax ® 550 acrylate, methyl Cellosolve ® acrylate, dicyclopentenyl acrylate, isodecyl acrylate, 2(2-ethoxyethoxy) ethylacrylate, polybutadiene diacrylate, tris(2-hydroxyethyl) isocyanurate triacrylate, epoxy diacrylate tetrabromo bisphenol A diacrylate. Monomers with vinyl group like vinyl pyrol, N-vinyl pyrrolidone and vinyl ethers are usable. Also, oligomers with mono or multifunctional groups such as the ones with carbon group for alkali removability, and the ones with both acrylate and isocyanate end groups are useful.

Particularly preferred monomers are polyoxyethylated trimethylolpropane triacrylate, ethylated pentaerythritol triacrylate, dipentaerythritol monohydroxypentaacrylate and 1,10-decanediol dimethylacrylate. Others are caprolactone acrylates and methacrylates, propoxylated neopentyl glycol diacrylates and methacrylates.

Di-(3-acryloxy-2-hydroxypropyl) ether of bisphenol A and Di-(3-methacryloxy-2-hydroxypropyl) ether of bisphenol A oligomers, generally referred to as unsaturated bisphenol A oligomers are of particular interest because they provide higher photospeed; also urethane diacrylates and methacrylates with aliphatic or aromatic backbones, referred to as unsaturated urethane oligomers are of particular interest, because they provide both higher photospeed and higher flexibility.

Monomers which expand on polymerization can be used in part with the standard monomers to achieve compositions giving no shrinkage or warpage upon exposure. These monomers are based on polycyclic ring opening mechanisms. Spiro orthocarbonates, spiroorthoesters and bicyclic ortho esters are known to belong to this class.

Typical monomers are norborene spiro orthocarbonate, and bismethylene spiro orthocarbonate. Monomers which undergo cationic polymerization are also useful in this invention. Representative classes of monomers are cyclic ethers cyclic formals and acetals, lactones, vinyl monomers, sulfur containing monomers, organosilicone monomers, monofunctional epoxies, difunctional epoxies, epoxy prepolymers and higher oligomers and epoxy end-capped silicone resins. They can be found in the open literature. One such reference is "Photoinitiated cationic polymerization" by James V. Crivello in "UV Curing: Science and Technology" edited by S. P. Pappas, published by Technology Marketing Corporation, 1978. Other ring opening monomers can be found in "Ring Opening Polymerization" Edited by K. J. Ivin and T. Saegusa, Elsevier Applied Science Publishers, London and New York, 1984.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; α-hydrocarbon-substituted aromatic acyloins, including α-methylbenzoin α-allylbenzoin and α-phenylbenzoin, others are 1-hydroxycyclobenyl phenol ketone, diethoxyphenol acetophenone, 2-methyl-1-[4-(methylthio)phenyl], 2-morpholino-propane-1, benzophenone, Michler's ketone, substituted triphenyl imidazolyl dimers with chain transfer agent camphoquinone etc. Photoreducible dyes and reducing agents disclosed in U.S. Pat. Nos. 2,850,445, 2,875,047, 3,097,096, 3,074,974, 3,097,097 and 3,145,104, as well as dyes of the phenazine, oxazine, and quinone classes, Michler's ketone, benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat. No. 4,162,162. The photoinitiator or photoinitiator system is present in 0.05 to 10% by weight based on the total weight of the photoformable composition. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2-methylanthraquinone, 2-ethylanthraquinone, 2-tert-butylanthraquinone, octamethylanthraquinone, 1,4-naphthoquinone, 9,10-phenanthraquinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Also, alpha amino aromatic ketones, halogenated compounds like trichloromethyl substituted cyclohexadienones and triazines or chlorinated acetophenone derivatives, thioxanthones in presences or tertiary amines, and titanocenes.

Typical classes of initiators for cationic polymerization are aryldiazonium salts, diaryliodonium salts comprising nonnucleophilic counterions such as $SbF_6^-$, $BF_4^-$, $PF_6^-$, $ClO_4^-$, $CF_3SO_3^-$, $AsF_6^-$, triacylsulfonium salts, triarylselenium salts or Iron arene complex. Examples of these include but are not limited to 2,5-diethoxy-4-(p-tolylmercapto) benzene diazonium $PF_6^-$, 4-dimethylamine-naphthalene diazonium $PF_6^-$, diphenyliodonium hexafluoroarsenate, di-t-butyldiphenyliodonium hexaflurophosphate FX-512 sulfonium salt (by 3M Company), triethylsulfonium iodide, CG24-61 (by Ciba Geigy). One good reference book is Photoinitiation of Cationic Polymerization mentioned earlier.

Sensitizers useful with these photoinitiators for radical polymerization include but are not limited to methylene blue and those disclosed in U.S. Pat. Nos. 3,554,753; 3,563,750; 3,563,751; 3,647,467; 3,652,275; 4,162,162; 4,268,667; 4,351,893; 4,454,218; 4,535,052; and 4,565,769. A preferred group of sensitizers include the bis(p-dialkylaminobenzylidine) ketones disclosed in Baum et al., U.S. Pat. No. 3,652,275 and the arylyidene aryl ketones disclosed in Dueber, U.S. Pat. No. 4,162,162, as well as in U.S. Pat. Nos. 4,268,667 and 4,351,893. Useful sensitizers are also listed in Dueber, U.S. Pat. No. 4,162,162 column 6, line 1 to line 65. Particularly preferred sensitizers include the following: DBC, i.e., cyclopentanone; 2,5-bis-[4-(diethylamino)-2-methylphenyl]methylene]-; DEAW, i.e., cyclopentanone, 2,5-bis[4-(diethylamino)phenyl]methylene]-; dimethoxy-JDI, i.e., 1H-inden-1-one, 2,3-dihydro-5,6-dimethoxy-2-[(2,3,6,7-tetrahydro-1H,5H-benzo[i,j]quinolizin-9-yl)methylene]-, and JAW, i.e., cyclopentanone, 2,5-bis[(2,3,6,7-tetrahydro-1H,5H-benzo[i,j]quinolizin-1-yl)methylene]-. Also useful are cyclopentanone 2,5-bis[2-(1,3-dihydro-1,3,3-trimethyl-2H-indol-2-ylidene)ethylidene], CAS 27713-85-5; and cyclopentanone, 2,5-bis-[2-ethylnaphtho[1,2-d]thiazol-2(1H)-ylidene)ethylidene], CAS 27714-25-6.

Sensitizers for cationic polymerization include but are not limited to perylene, acridine orange, acridine yellow, phosphene R, benzoflavin & Setoflavin T.

Hydrogen donor compounds useful as chain transfer agents in the photopolymer compositions include: 2-mercaptobenzoxazole, 2-mercaptobenzothiazole, 4-methylesters, alcohols, compounds containing allylic or benzylic hydrogen cumene, acetals, aldehydes, and amides as disclosed in column 12, lines 18 to 58 of MacLachlan, U.S. Pat. No. 3,390,996.

Other components may also be present in the photoformable compositions, e.g., dyes, pigments, extenders, organic or inorganic fillers, organic or inorganic reinforcement fibers, polymerization inhibitors, thermal stabilizers, viscosity modifiers, interlayer and generally interfacial adhesion promoters, such as organosilane coupling agents, coating aids, etc., so long as the photoformable compositions retain their essential properties.

In operation of a preferred embodiment of this invention, the radiation means 10 shown in FIG. 1, provides a radiation beam 12 having an intensity as aforementioned. The radiation beam 12 passes through a modulator 14, where its intensity may be modulated from zero intensity level to a maximum beam intensity having a value less than that of the unmodulated beam intensity, due to energy losses. The modulated radiation beam 12', having somewhat decreased intensity due to losses, passes in turn through deflection means 16 having a two-mirror 20 and 22 assembly, each mirror separately driven by a different motor 24 and 26 respectively. Mirror 20, driven by motor 24 deflects the beam in a X direction, while mirror 22 deflects the beam in a Y direction, X direction being perpendicular to the Y direction. Electrical feedback regarding the relative movements of the mirrors 20 and 22 is provided by the deflection means to computer means 34 through line 54. This feedback, being correlatable to the velocity and average residence time of the beam on the predetermined portions of the thin layer 48, is processed by computer means 34, and it is fed to the modulation means 14 as a control command through line 50 in order to modulate the intensity of the radiation beam, so that the product of the intensity of the beam and the average residence time at each position of the predetermined portions of layer 48 remains substantially constant. Thus, the exposure level, being by definition the product of these two parameters, remains substantially constant. By maintaining the exposure level constant over the predetermined portions of each successive thin layer, the thickness of the layers is also kept substantially constant. This correction or compensation is very important, especially at unsupported portions of the thin layers, where swollen edges will appear as a result of overexposure due to the low initial velocity at the edges in vector scanning. The higher the intensity of the beam 12" or the higher the photosensitivity of the photoformable composition the more severe this problem becomes in the absence of means to maintain the exposure level constant. Also, the greater the sensitivity of the composition 40, the more severe the problem becomes without some means of exposure control. Such exposure control is also necessary in raster scanning or in systems incorporating overscanned vector schemes, the difference being that the edges of the image may be underexposed due to lack of exposure contribution from adjacent non-exposed regions. In these cases, modulation means are utilized to ensure that the image edges receive substantially the same exposure as non-edge image regions.

In any event, radiation beam 12", is controllably directed towards photoformable composition 40, which is contained in vessel 44.

Initially, plate 47 is in position A, as shown in FIG. 2, guiding film 45 to be parallel and at a predetermined distance from platform 41, corresponding to the desired thickness of a layer, allowing photoformable composition 40 to be present as a layer 48 between the platform 41 and the second surface 45" of flexible film 45. The layer 48 is then imagewise exposed by the actinic radiation of beam 12". Upon imagewise solidification of layer 48, plate 47 is slowly removed by a translational motion, using conventional removing means, to position B, as shown in FIG. 3. During this translational motion of plate 47, tension element 49, functioning primarily as a tensioner for the film, also causes the film to be gradually detached from the solidified layer at a line front over the linear edge 70 of plate 47, so that tension mechanism 49 also acts as detaching means. At this point, placement means 42 moves platform 41 in a direction perpendicular to the planes defined by the surfaces of the film in its original position C, in order to increase the distance between the platform and the original position of the film C by the thickness of a layer. Plate 47 is then resecured at its original position A.

The same cycle is repeated until the three dimensional object has been completed. If the photoformable composition comprises plastisol or other thermally coalescible material further thermal treatment as aforementioned is in most cases required. In cases where no thermally coalescible materials are present the post treatment in many cases does not offer any drastic advantages. control/feedback lines 54 and 50, respectively. The graphic data corresponding to the shape of the solid object under production are also stored in computer means 34. The graphic data stored in computer means 34, after being processed cause motors 24 and 26 to turn and move mirrors 20 and 22 accordingly in order to deflect the radiation beam towards predetermined positions on the thin layer 48. It is preferable that computer 34 also controls and commands the rest of the components through appropriate data fed into the computer so that these components perform timely and accurately their functions by methods well known to the art.

Although this method of coating is not limited relative to layer thickness, it is preferable that layers of 30 mils or less be produced.

The Applicants propose the following mechanisms as a possible explanation to the results obtained according to the instant invention. However, this proposal is merely a suggestion, and it must be taken only as such by the reader. By no means, should Applicants' proposal be construed as limiting in any way the breadth and scope of this invention.

It seems that detaching the film in an angle, rather than pulling a rigid transparent plate, transforms the removal forces from a sum of adhesion forces distributed over the total area of the plate to a sum of adhesion forces distributed along a line at the detaching or peeling bent of the film at any time. Such a change in removal force distribution area vastly reduces the total effort of removal of the film. Secondly, whenever a film is rolled, as it would be during peeling, the outer diameter of the film is forced to stretch slightly and the inner diameter is slightly compressed. Since the outer diameter, while peeling, is the surface in intimate contact with the solidified layer, and this outer diameter is stretching, the mechanical bonds between the film and the solidified layer are broken. Even substantially smooth films have some degree of waviness or surface roughness on a microscopic level, and when a material is hardened or solidified in intimate contact with this microscopically rough surface it mates with it forming mechanical bonds. Thirdly, a peeling action can be viewed as the opening of an orifice into which other materials, such as a gas or a liquid or in general a deformable material, must flow. When such a orifice is small the flow resistance of the gas or liquid or other deformable material rushing in to fill a void increases. A small orifice exists between the surface of a rigid plate or film and the material in intimate contact with these surfaces when attempts are made to separate the two. So air, and in the case of the instant invention, a photoformable and deformable composition, usually being in the form of a rather viscous material, must flow through this small orifice to fill the void created by the separation of these two surfaces. The high resistance to flow through this orifice slows the flow rate down significantly, making separation of the two surfaces either extremely time consuming or extremely strenuous. A peeling action opens the orifice to a larger dimension and significantly reduces the resistance of flow of the liquid or gas or other deformable material trying to fill the void created at the line of detaching, allowing quick separation of the film from the surface of the photohardened or solidified composition with little effort.

The advantage of having a rigid transparent plate on top of the flexible film is that the plate:

provides surface flatness for the newly coated deformable layer, and thus flatness for the exposed area.

prevents the oxygen from entering the system during exposure, thus improving the photospeed.

forces the transparent flexible film to be held firmly within the photoformable composition.

The advantages of the Applicants' invention can be more greatly appreciated when it is also considered that the layers of the photohardened or solidified composition are thin and sometimes unsupported other than as cantilevered or beam sections. These thin layers cannot withstand much load. The forces involved in peeling the film from the surface of these layers is significantly less stressful on the layers than removal of the film, or relatively rigid plate for that matter, by other means.

In addition, the Applicants suggest that sliding the substantially rigid transparent plate horizontally and detaching the film at the edge of the substantially rigid transparent plate reduces the stresses in the surface of the thin layers even further. Cantilevered sections and beam sections have a stiffness that decreases roughly as a function of the unsupported length of the overhang cubed. The substantially rigid transparent plate forces the detaching action to be sharper and close to the edge of the substantially rigid transparent plate, and the substantially rigid transparent plate acts as a support to the undetached sections of layers that are cantilevered or beam sections, thereby reducing the unsupported length of that section and increasing its stiffness. A detaching action performed at the edge of the substantially rigid transparent plate, or similar surface, as the substantially rigid transparent plate translates horizontally, or in general at a direction parallel to the plane of the platform, significantly improves the flatness accuracy and integrity of the solidified layers formed.

Another advantage of moving the substantially rigid transparent plate horizontally away during this detaching action is that the surface of each detached layer is immediately covered by the photoformable composition, in case it is a liquid, which has a surface level substantially above the solidified layer and flows quickly into the void created by the movement of the substantially rigid transparent plate and the film. This prevents the introduction of bubbles into the photoformable composition and reduces the deleterious effects of oxygen inhibition that may cause a degradation of interlayer adhesion and slow photospeed. In the case of non-liquid compositions, means such as doctor knives, extruders, heated bars, and the like may be used to force the composition into place. In addition, movement of the substantially rigid transparent plate horizontally, which is also below the surface of the photoformable composition, and (reverse detaching) laying down of the film by causing it to slide around under the edge of the substantially rigid transparent plate is a gentle way of creating the proper thickness of photoformable composition for the next layer since the composition is forced to move, for the most part, horizontally along the surfaces of the previously formed layers rather than vertically into the layers, which may distort or damage them.

Submergence of the film under the substantially rigid transparent plate also ensures that hydraulic pressure holds or at least helps in holding the film flat against the bottom of the plate. To ensure good optical coupling between the substantially rigid transparent plate, the film and the photoformable composition it is preferable that the materials be refractive index matched as closely as possible and/or a coupling fluid, preferably of similar refractive index be used between the film and the plate to fill in any gaseous voids or voids of other type that may occur at their interface. This coupling fluid may also act as a lubricant between the film and the plate during the detaching and recoating process. Examples of such coupling fluids are Laser Liquids™ manufactured by R. P. Cargille Laboratories of Cedar Grove, N.J. It is also preferable that the air contacting side of the substantially rigid transparent plate be coated with the proper dielectric optical coating for optimum radiation beam coupling into said transparent plate.

With this process of coating or application of layers, excess movements of the movable platform are avoided. It is necessary to move the platform away from the tensioned film 45 only by the thickness of one layer for each imaging step. This increases considerably the speed of production, and in addition it is less damaging or distorting to the layers being made, since the movement is small and the hydraulic forces of fluid flow are largely absorbed by the lower surface of the platform, in contrast to other methods based on plunging the platform to a considerable distance away from the surface of the liquid and then retracting to attain the desired thickness of the liquid layer. It becomes also clear that the distance between the platform 41 and the tensioned film 45 during every imaging step determines the depth or thickness of each layer, according to the present invention, as the thickness of each layer is defined by the distance between the lower surface of the flexible transparent film and the upper surface of the platform or by the amount of exposure on the initial layer, and on subsequent layers by the distance between the lower surface of the flexible transparent film and the previous layer top surface or the amount of exposure for subsequent layers.

Although the Applicants have herein disclosed specific preferred embodiments of the instant invention, the general scope of this invention is limited only by the appended claims and their equivalents.

What is claimed is:

1. A method for quickly and accurately fabricating an integral three-dimensional object from successive solidified layers of a deformable and photoformable composition comprising the steps of:
   (a) placing the composition in a vessel containing a substantially flat platform;
   (b) positioning within the composition a tensioned, transparent, flexible and non-adherent film having a first and a second surface, the first surface being opposite and parallel to the second surface, the first surface being disposed in a way to prevent wetting of said first surface by the composition, and at least part of the second surface being disposed in a way to be in contact with the composition;
   (c) securing on top of the film at a first position, a substantially flat, substantially rigid and substantially transparent plate having an upper and a lower planar surface, the upper surface being opposite and parallel to the lower surface, such that the lower planar surface of the plate is parallel to and in contact with the first surface of the film, the plate guiding the film to an original position so that the film becomes parallel and lies on top of the flat platform at a distance equal to the thickness of a layer;
   (d) exposing imagewise the photoformable composition contained between the film and the platform to radiation through the transparent plate and through the transparent film, in order to form a solidified layer, with the requirement that the radiation is high enough to cause reasonable adherence between the solidified layer and the platform;
   (e) removing the transparent plate from the first position on top of the platform to a second position away from the platform;
   (f) peeling the film from the solidified layer, and from the unexposed deformable composition;
   (g) causing the deformable composition to flow over the solidified layer;
   (h) increasing the distance between the platform and the original position of the film by the thickness of a layer;
   (i) repositioning the film within the composition as in step (b);
   (j) resecuring the plate at the first position on top of the film, such that the lower planar surface of the plate is parallel to and in contact with the first surface of the film, the plate guiding the film such that it is parallel to and lying on top of the previously solidified layer at a distance equal to the thickness of a layer;

(k) exposing imagewise to radiation, through the transparent plate and through the transparent film, the photoformable composition contained between the film and the previously solidified layer in order to form a new solidified layer, with the requirement that the radiation is high enough to cause reasonable adherence between the newly solidified layer and the previously solidified layer;

(l) removing the transparent plate again from the first position on top of the platform to the second position away from the plate;

(m) peeling the film from the newly solidified layer and from the unexposed deformable composition; and (n) repeating steps (g) through (m) until the integral three-dimensional object is formed.

2. A method as defined in claim 1, wherein the deformable composition is a liquid.

3. A method as defined in claim 1, wherein the deformable composition is a non-liquid.

4. A method as defined in claim 1, wherein the platform is movable in a way substantially normal to the transparent plate, when said plate is at the first position.

5. A method as defined in claim 4, wherein the step of removing the plate and the step of peeling the film are conducted simultaneously.

6. A method as defined in claim 5, wherein the plate has a linear edge, and the removing step is conducted by a substantially horizontal translational motion of said plate, while the film is peeled around the linear edge.

7. A method as defined in claim 1 wherein the plate and the film are refractive index matched.

8. A method as defined in claim 6 wherein the plate and the film are refractive index matched.

9. A method as defined in claim 1 wherein an optical coupling fluid is placed between the plate and the film.

10. A method as defined in claim 6 wherein an optical coupling fluid is placed between the plate and the film.

11. A method as defined in claim 1 wherein at least part of the film is elastomeric.

12. A method as defined in claim 6 wherein at least part of the film is elastomeric.

13. A method as defined in claim 1 wherein the radiation is in the form of a laser beam.

14. A method as defined in claim 6 wherein the radiation is in the form of a laser beam.

15. A method as defined in claim 1 wherein the radiation is modified by a variable optical density photomask.

16. A method as defined in claim 6 wherein the radiation is modified by a variable optical density photomask.

17. A method as defined in claim 1 wherein the photoformable composition comprises plastisol.

18. A method as defined in claim 6 wherein the photoformable composition comprises plastisol.

19. An apparatus for quickly and accurately fabricating an integral three-dimensional object from successive solidified layers of a deformable and photoformable composition comprising an assembly of:

imaging means for imagewise exposing to radiation each of the successive layers of the photoformable composition; and a coating station comprising, a vessel for containing the composition;

a substantially flat platform disposed within the vessel;

a transparent, flexible and non-adherent film supported under tension over the platform, the film having a first and a second surface, the first surface being opposite and parallel to the second surface, the film intended to be operable within the composition in a manner preventing wetting of the first surface by the composition, and allowing at least part of the second surface to be in contact with the composition;

a substantially flat, substantially rigid and substantially transparent plate secured at a first position on top of the film, the plate having an upper and a lower planar surface, the upper surface being at the opposite side of and parallel to the lower surface, such that the lower planar surface of the plate is also parallel to and in contact with the first surface of the film, the plate guiding the film to be on top and parallel to the flat platform;

placement means for controllably varying the distance between the second surface of the film and the platform in order to allow the successive layers of the photoformable composition to be formed under said second surface and be solidified by the imagewise exposure to radiation provided by the imaging means;

means for removing the plate from its first position to a second position;

means for causing the deformable composition to flow over the solidified layer; and means for peeling the film.

20. An apparatus as defined in claim 19, wherein the deformable composition is a liquid.

21. An apparatus as defined in claim 19, wherein the deformable composition is a non-liquid.

22. An apparatus as defined in claim 19, wherein the imaging means comprises:

radiation means for providing a radiation beam, the radiation beam having an intensity;

deflection means for controllably deflecting the radiation beam;

modulation means positioned between the radiation means and the deflection means for modulating the intensity of the radiation beam; and computer means for storing graphic data corresponding to the shape of the rigid object, the computer means being also coupled to the modulation means, the deflection means and the placement means, in order to control said modulation means, deflection means and placement means according to the graphic data.

23. An apparatus as defined in claim 19, wherein the radiation beam comprises a laser beam.

24. An apparatus as defined in claim 19, wherein the placement means is connected to the platform and provides movement to the platform in a substantially vertical direction.

25. An apparatus as defined in claim 23, wherein the means for removing the plate provides a substantially translational motion to the plate.

26. An apparatus as defined in claim 19 wherein the plate and the film are refractive index matched.

27. An apparatus as defined in claim 24 wherein the plate and the film are refractive index matched.

28. An apparatus as defined in claim 19 further comprising an optical coupling fluid placed between the plate and the film.

29. An apparatus as defined in claim 24 further comprising an optical coupling fluid placed between the plate and the film.

30. An apparatus as defined in claim 19 wherein at least part of the film is elastomeric.

31. An apparatus as defined in claim 24 wherein at least part of the film is elastomeric.

32. An apparatus as defined in claim 19, wherein the imaging means comprises a variable optical density photomask.

33. An apparatus as defined in claim 17 wherein the photoformable composition comprises a plastisol.

34. An apparatus as defined in claim 22 wherein the photoformable composition comprises a plastisol.

* * * * *